March 22, 1966  L. D. McCAULEY  3,241,408
VEHICLE WHEEL NUT OR BOLT
Filed April 30, 1964
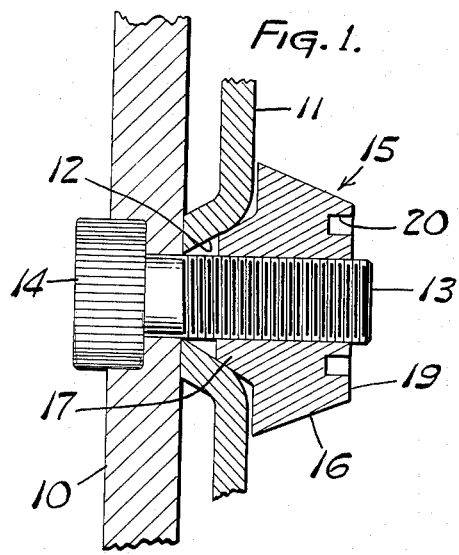
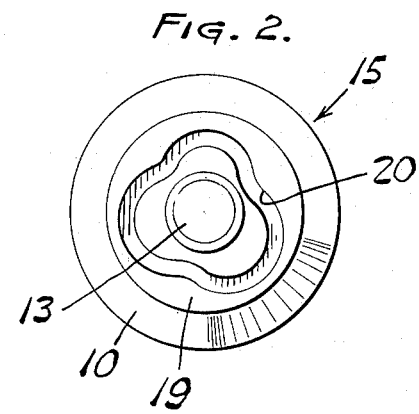
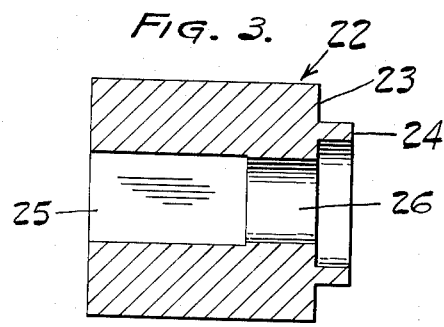
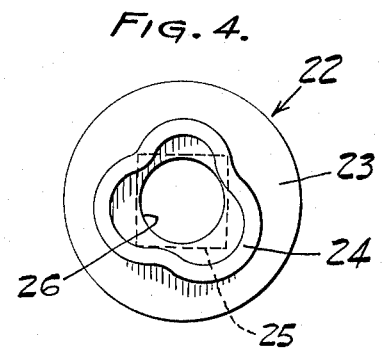
INVENTOR.
LEWIS D. McCAULEY
BY
Christel & Bean
ATTORNEYS

United States Patent Office 3,241,408
Patented Mar. 22, 1966

3,241,408
VEHICLE WHEEL NUT OR BOLT
Lewis D. McCauley, 229 Mount Vernon Road,
Snyder, N.Y.
Filed Apr. 30, 1964, Ser. No. 363,707
8 Claims. (Cl. 81—71)

This invention relates to vehicle wheels and more particularly to novel nuts or screws for retaining such wheels to prevent theft and wrench means for applying or removing such nuts or screws.

Vast sums of money are lost annually through the theft of wheels and tires from vehicles. A particular problem exists in the case of automobile dealers who must necessarily leave considerable numbers of vehicles in lots and other places accessible to those wishing to steal automobile wheels and the tires with which such wheels are normally equipped. Special key operated locking devices for wheel nuts are available but such locking devices are too expensive for use on the scale here contemplated and, in any event, are usually intended merely for locking spare wheels in a vehicle trunk, the lock being too large to fit beneath the usual vehicle wheel hub cap.

In some vehicle wheel mounting arrangements the members which are applied and removed by means of a wrench to mount or remove a wheel comprise nuts applied to fixed projecting screws or studs and in other cases the removable members are screws which thread into fixed threaded openings on a brake housing or brake support or other member to which the wheel is applied or into nuts secured to such support members. The principles of the present invention are applicable in either of these cases. In the former case the wheel nuts, or at least one of such nuts on each wheel, have special configurations, and in the latter case the head of a wheel retaining screw has a similar special configuration.

As will appear more clearly later herein, these special configurations are such that only special wrenches having configurations complementary to the nut or screw configuration and supplied only to authorized personnel are effective to remove the nut or screw, as the case may be. Broadly speaking, the concept of providing specially shaped nuts and screw heads and special cooperating wrenches is not new. However, the present invention provides special nut configurations and screw heads which are practical to manufacture and use and, what is more important, configurations which do not lend themselves to removal by such tools as pipe wrenches, vise lock pliers and the various special tools which thieves readily and ingeniously improvise when faced with removal problems of this general character.

The features of construction which render the wheel nuts and screws of the present invention particularly tamper-proof and theft-proof and the reasons why this is so will be discussed more fully later herein with reference to a representative embodiment of the principles of the invention.

Other objects and advantages of the construction of the present invention will become apparent to those skilled in the art from a consideration of such representative embodiment.

While a single specific embodiment of the principles of the present invention is illustrated in the accompanying drawing and described in detail in the following specification, it is to be understood that such embodiment is by way of example only and that various mechanical modifications may be made without departing from the spirit of the invention, the scope of which is limited only as defined in the appended claims.

In the drawing:

FIG. 1 is a cross sectional view taken on a plane through the axis of a wheel mounting stud or screw having one form of the wheel securing nut of the present invention applied thereto;

FIG. 2 is an elevational view of the outer surface of the nut of FIG. 1;

FIG. 3 is a cross sectional view along the axis of one form of wrench element for tightening and loosening the nut of FIG. 1 or a similarly formed screw head; and FIG. 4 is an end elevational view of the wrench element of FIG. 3.

In the drawing like characters of reference denote like parts and, referring particularly to FIG. 1, the numeral 10 designates a member to which a vehicle wheel is conventionally secured, such as the rotatable member of a wheel brake unit. A portion of a wheel member adjacent to one of the holes therein by means of which the wheel is mounted is designated 11 in FIG. 1. The mounting hole is provided with a countersink formation 12.

In FIG. 1 one of the circumaxial series of screws or studs upon which the wheel is mounted is designated 13. One conventional manner of mounting the wheel supporting and securing screws is shown in FIG. 1 wherein screw 13 has a serrated head 14 which is driven into a counterbore in brake member 10. It is to be understood that so much of the construction as has been thus far described is entirely conventional and that the only novel portion of FIG. 1 resides in the wheel securing nut element which is designated generally by the reference numeral 15.

Referring to the nut element 15 per se, in the form illustrated in FIGS. 1 and 2 a frusto-conical body portion 16 is provided at its larger end, which comprises the rear face of the nut element, with a reduced tapered portion 17 which engages the countersink formation 12 of wheel 11 to center the wheel opening with respect to screw 13 and provide a frictional wedging nut retaining force in a conventional manner.

The small end of the frusto-conical body portion 16 of nut 15 comprises the outer face thereof and radial surface 19 is provided with a continuous endless groove 20 which is generally rectangular in transverse cross section as appears from FIG. 1. It will be noted from FIG. 2 that groove 20 presents a continuously curving outline of a non-symmetrical pattern and with no straight-line portions.

Wrenches for removing nut 15 may take various forms and by way of example, FIGS. 3 and 4 illustrate a socket wrench member of generally cylindrical form designated generally by the numeral 22. An end face 23 of member 22 has projecting therefrom a rib or wall formation 24. Rib or wall 24 forms a continuous closed figure and its outline is the same as the outline of groove 20 of nut 15, having only enough clearance so that it may fit snugly within groove 20. Wrench member 22 has a square hole 25 for receiving the usual socket wrench operating rod and the numeral 26 designates a clearance hole for the outer end of screw 13. Of course the hole 25 may be hexagonal or of other non-circular form to suit the configuration of various socket wrench operating rods or bars.

The use of a slot comprising a closed curvilinear figure is important since it prevents unauthorized removal of nuts by various expedients. If the slot had an end one could place a screw driver or chisel against the end of the slot and loosen the nut by tapping against the other end of the screw driver or chisel with a hammer. Furthermore, if the slot were to emerge at the conical face of the nut a tapping operation could be employed to loosen the nut.

If the slot includes a straight portion of substantial length a device such as the end of a chisel or a large screw driver may be wedged in the straight portion and a hammer may be tapped against the chisel or screw driver just outwardly of the nut to loosen the same. The choice of a conical outer periphery of the nut is likewise calculated to prevent unauthorized removal by use of a pipe wrench or the like.

I claim:

1. A threaded fastener for vehicle wheels comprising means adapted to be engaged by a wrench for applying and removing the same to and from a cooperating threaded member, said means comprising a frusto-conical body having a relatively flat radial outer face at its small end, a curvilinearly extending channel of substantially constant width in said outer face forming a continuous closed figure substantially devoid of straight line portions and of varying curvature whereby various portions of said closed figure lie at various distances from the axis of said frusto-conical body.

2. A threaded fastener for vehicle wheels comprising means adapted to be engaged by a wrench for applying and removing the same to and from a cooperating threaded member, said means comprising a frusto-conical body having a relatively flat radial outer face at its small end, a curvilinearly extending channel of substantially constant width in said outer face forming a continuous closed figure substantially devoid of straight line portions and of varying curvature whereby various portions of said closed figure lie at various distances from the axis of said frusto-conical body, said channel having opposed side walls substantially perpendicular to said outer face.

3. A nut for vehicle wheels comprising a frusto-conical body having a threaded axial opening therein and a relatively flat radial outer face at its small end, a curvilinearly extending channel of substantially constant width in said outer face forming a continuous closed figure substantially devoid of straight line portions and of varying curvature whereby various portions of said closed figure lie at various distances from the axis of said frusto-conical body.

4. A nut for vehicle wheels comprising a frusto-conical body having a threaded axial opening therein and a relatively flat radial outer face at its small end, a curvilinearly extending channel of substantially constant width in said outer face forming a continuous closed figure substantially devoid of straight line portions and of varying curvature whereby various portions of said closed figure lie at various distances from the axis of said frusto-conical body, said channel having opposed side walls substantially perpendicular to said outer face.

5. In combination a threaded fastener for vehicle wheels having a head comprising a frusto-conical body, and a relatively flat radial outer face at its small end, a curvilinearly extending channel of substantially constant width in said outer face forming a continuous closed figure substantially devoid of straight line portions and of varying curvature whereby various portions of said closed figure lie at various distances from the axis of said frusto-conical body, and a wrench for engagement with said body to apply and remove the same with respect to a cooperating threaded member, said wrench having a radial face adapted to be directed toward the radial face of said threaded member, and a flange formation projecting from the radial face of said wrench, said flange having a curvilinear configuration coincident with the configuration of said channel and being of a width slightly less than the width of said channel whereby said flange fits snugly within said channel to securely lock said wrench to said body whereby rotation of said wrench tightens or loosens said threaded member.

6. In combination a threaded fastener for vehicle wheels having a head comprising a frusto-conical body and a relatively flat radial outer face at its small end, a curvilinearly extending channel of substantially constant width in said outer face forming a continuous closed figure substantially devoid of straight line portions and of varying curvature whereby various portions of said closed figure lie at various distances from the axis of said frusto-conical body, and a wrench for engagement with said body to apply and remove the same with respect to a cooperating threaded member, said wrench having a radial face adapted to be directed toward the radial face of said threaded member, and a flange formation projecting from the radial face of said wrench, said flange having a curvilinear configuration coincident with the configuration of said channel and being of a width slightly less than the width of said channel whereby said flange fits snugly within said channel to securely lock said wrench to said body whereby rotation of said wrench tightens or loosens said threaded member, said channel and said flange having opposed side walls substantially perpendicular to the axis of rotation of said fastener.

7. In combination a threaded fastener for vehicle wheels having a head comprising a frusto-conical body and an outer wrench receiving face at its small end, a curvilinearly extending channel of substantially constant width in said outer face forming a continuous closed figure substantially devoid of straight line portions and of varying curvature whereby various portions of said closed figure lie at various distances from the axis of said frusto-conical body, and a wrench for engagement with said body to apply and remove the same with respect to a cooperating threaded member, said wrench having a face adapted to be directed toward the outer face of said threaded member, and a flange formation projecting from said face of said wrench, said flange having a curvilinear configuration coincident with the configuration of said channel and being of a width slightly less than the width of said channel whereby said flange fits snugly within said channel to securely lock said wrench to said body whereby rotation of said wrench tightens or loosens said threaded member.

8. In combination a threaded fastener for vehicle wheels having a head comprising a frusto-conical body and an outer wrench receiving face at its small end, a curvilinearly extending channel of substantially constant width in said outer face forming a continuous closed figure substantially devoid of straight line portions and of varying curvature whereby various portions of said closed figure lie at various distances from the axis of said frusto-conical body, and a wrench for engagement with said body to apply and remove the same with respect to a co-operating threaded member, said wrench having a face adapted to be directed toward the outer face of said threaded member, and a flange formation projecting from said face of said wrench, said flange having a curvilinear configuration coincident with the configuration of said channel and being of a width slightly less than the width of said channel whereby said flange fits snugly within said channel to securely lock said wrench to said body whereby rotation of said wrench tightens or loosens said threaded member, said channel and said flange having opposed side walls substantially perpendicular to the axis of rotation of said fastener.

References Cited by the Examiner

UNITED STATES PATENTS

| 1,298,398 | 3/1919 | Purple. | |
| 2,338,023 | 12/1943 | Bugg | 84—45 |
| 2,362,999 | 11/1944 | Hewitt | 81—90 X |
| 2,813,450 | 11/1957 | Dzus | 85—45 |

FOREIGN PATENTS

| 556,145 | 9/1943 | Great Britain. |
| 943,521 | 12/1963 | Great Britain. |

BENJAMIN HERSH, *Primary Examiner.*

ARTHUR L. LA POINT, *Examiner.*